(12) United States Patent
Zhu et al.

(10) Patent No.: US 12,495,000 B2
(45) Date of Patent: Dec. 9, 2025

(54) METHOD AND APPARATUS FOR CONTROLLING FLOW ENTRY

(71) Applicant: Hangzhou AliCloud Feitian Information Technology Co., Ltd., Hangzhou (CN)

(72) Inventors: Shunmin Zhu, Hangzhou (CN); Yisong Qiao, Hangzhou (CN); Nianbing Yu, Hangzhou (CN); Zikang Chen, Hangzhou (CN)

(73) Assignee: Hangzhou AliCloud Feitian Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/685,218

(22) PCT Filed: Jan. 29, 2023

(86) PCT No.: PCT/CN2023/073725
§ 371 (c)(1),
(2) Date: Feb. 20, 2024

(87) PCT Pub. No.: WO2023/143579
PCT Pub. Date: Aug. 3, 2023

(65) Prior Publication Data
US 2025/0227066 A1    Jul. 10, 2025

(30) Foreign Application Priority Data

Jan. 30, 2022 (CN) .......................... 202210114494.0

(51) Int. Cl.
*H04L 45/76* (2022.01)
*H04L 45/02* (2022.01)
*H04L 45/745* (2022.01)

(52) U.S. Cl.
CPC .............. *H04L 45/76* (2022.05); *H04L 45/02* (2013.01); *H04L 45/745* (2013.01)

(58) Field of Classification Search
CPC ............. G06F 11/1451; G06F 11/2025; G06F 11/2046; G06F 2009/45579;
(Continued)

(56) References Cited

U.S. PATENT DOCUMENTS

| | | | |
|---|---|---|---|
| 2014/0130044 A1* | 5/2014 | Zhang ................. | G06F 9/45533 718/1 |
| 2014/0280547 A1* | 9/2014 | DeCusatis ............... | H04L 67/10 709/204 |

(Continued)

FOREIGN PATENT DOCUMENTS

| | | |
|---|---|---|
| CN | 101321088 A | 12/2008 |
| CN | 105589744 A | 5/2016 |

(Continued)

OTHER PUBLICATIONS

Translation of WO-2014067055-A1. (Year: 2014).*
(Continued)

*Primary Examiner* — Christopher Biagini
(74) *Attorney, Agent, or Firm* — Maschoff Brennan

(57) ABSTRACT

This specification provides a method and an apparatus for controlling a flow entry. The method includes: receiving a data message sent by a user, and determining a target flow entry matched with the data message, where the target flow entry is one of at least one flow entry corresponding to a target virtual machine in a local position; in a case that a first version number of the target virtual machine included in the target flow entry is inconsistent with a second version number of the target virtual machine recorded in the local position, deleting a flow entry including the first version number in the local position; and sending the data message
(Continued)

to a centrex, so that the centrex forwards the data message to a target host machine, where the second version number is generated in a case that the target virtual machine is migrated to the target host machine.

20 Claims, 5 Drawing Sheets

(58) Field of Classification Search
CPC . G06F 2009/45583; G06F 2009/45595; G06F 2201/80; G06F 2201/815; G06F 3/0619; G06F 3/065; G06F 3/0665; G06F 8/65; G06F 9/45558; H04L 12/4633; H04L 41/06; H04L 41/082; H04L 41/0859; H04L 45/02; H04L 45/38; H04L 45/745; H04L 45/76; H04L 67/10; H04L 67/1097; H04L 67/34
See application file for complete search history.

(56) References Cited

U.S. PATENT DOCUMENTS

| | | | |
|---|---|---|---|
| 2015/0309818 A1* | 10/2015 | Lee | H04L 49/70 718/1 |
| 2016/0188378 A1* | 6/2016 | Chao | G06F 9/5088 718/105 |
| 2021/0349767 A1* | 11/2021 | Asayag | G06F 9/4856 |

FOREIGN PATENT DOCUMENTS

| | | | | |
|---|---|---|---|---|
| CN | 106909439 A | | 6/2017 | |
| CN | 109412925 A | | 3/2019 | |
| CN | 110324245 A | | 10/2019 | |
| CN | 111698167 A | | 9/2020 | |
| CN | 111740909 A | | 10/2020 | |
| CN | 111740910 A | | 10/2020 | |
| CN | 113220413 A | | 8/2021 | |
| CN | 113254148 A | * | 8/2021 | ........... H04L 61/103 |
| CN | 113672354 A | | 11/2021 | |
| CN | 113703921 A | | 11/2021 | |
| CN | 114598645 A | | 6/2022 | |
| WO | WO-2014067055 A1 | * | 5/2014 | ............. H04L 45/38 |
| WO | 2021169514 A1 | | 9/2021 | |
| WO | WO-2022088743 A1 | * | 5/2022 | ............. H04L 49/70 |

OTHER PUBLICATIONS

Chinese Office Action, as issued in connection with Chinese Application No. 2024062802183170, dated Jun. 28, 2024, 17 pgs.

Notice of Allowance as received in Chinese Application No. 202210114494.0, dated Sep. 27, 2024.

Yanzhi et al., Software defining network virtualization scheme based on OpenFlow, Application Research of Computers, Nov. 2018, vol. 35, No. 11, China.

China National Intellectual Property Administration; International Search Report and Written Opinion issued in PCT App. No. PCT/CN2023/073725 dated Apr. 27, 2023; 14 pages.

* cited by examiner

METHOD AND APPARATUS FOR CONTROLLING FLOW ENTRY

CROSS-REFERENCE TO RELATED APPLICATION

This application is a National Stage of International Application No. PCT/CN2023/073725, filed on Jan. 29, 2023, which claims priority to Chinese patent application No. 202210114494.0, filed with the China National Intellectual Property Administration on Jan. 30, 2022 and entitled "METHOD AND APPARATUS FOR CONTROLLING FLOW ENTRY". These applications are hereby incorporated by reference in their entireties.

TECHNICAL FIELD

Embodiments of this specification relates to the field of computer technology and, in particular, to a method for controlling a flow entry.

BACKGROUND

With rapid development of cloud computing and virtualization technology, the scale of deployment in a cloud computing production environment is increasingly large. The development of virtualization technology has led to the emergence of virtual servers (also known as virtual machines). A virtual machine refers to a complete computer system that is simulated through software, has complete hardware system functionality, and runs in a completely isolated environment. When there is a hardware failure requiring maintenance or a shift of a need for data processing, running services need to be migrated to another platform to continue running, and this process cannot have an impact on application services hosted by the virtual machine. This involves virtual machine migration technology, which enables the virtual machine to be migrated quickly online between physical machines and keeps the virtual machine running uninterruptedly during the running process, effectively improving resource allocation. It can be seen that the virtual machine may be migrated on different host machines.

During actual use, if the virtual machine is to be migrated, a flow table corresponding to the virtual machine needs to be aged and deleted before migration. However mostly at present, searching and polling are performed one by one according to flow table information corresponding to the virtual machine, which requires traversing all flow tables. This process requires a lot of time, and during this period, a large number of messages may still be forwarded following the behavior conducted when the flow table is not deleted, resulting in a message forwarding error. Therefore, an effective method is urgently needed to solve such problem.

SUMMARY

In view of this, embodiments of this specification provide a method for controlling a flow entry. One or more embodiments of this specification also involve an apparatus for controlling a flow entry, a computing device, a computer-readable storage medium and a computer program, to solve the existing technical deficiencies in the prior art.

According to a first aspect of embodiments of this specification, a method for controlling a flow entry is provided, including:

receiving a data message sent by a user, and determining a target flow entry matched with the data message, where the target flow entry is one of at least one flow entry corresponding to a target virtual machine in a local position;

in a case that a first version number of the target virtual machine included in the target flow entry is inconsistent with a second version number of the target virtual machine recorded in the local position, deleting a flow entry including the first version number in the local position; and sending the data message to a centrex, so that the centrex forwards the data message to a target host machine, where the second version number is generated in a case that the target virtual machine is migrated to the target host machine.

In an implementation, the method for controlling a flow entry further includes:

generating the first version number of the target virtual machine and adding the first version number to the at least one flow entry;

recording the second version number of the target virtual machine after migration in a case that it is determined that the target virtual machine is migrated from the local position to the target host machine.

In an implementation, the method for controlling a flow entry further includes:

in a case that the target flow entry matched with the data message is not found, sending the data message to the centrex, so that the centrex generates a first flow entry according to the data message;

adding the first version number to the first flow entry.

In an implementation, the method for controlling a flow entry further includes:

in the case that the first version number of the target virtual machine included in the target flow entry is inconsistent with the second version number of the target virtual machine recorded in the local position, sending the data message to the centrex, so that the centrex generates a second flow entry corresponding to the data message;

adding the second version number to the second flow entry, performing forwarding processing on the data message according to the second flow entry, and delivering the second flow entry to the target host machine.

In an implementation, the method for controlling a flow entry further includes:

in a case that the first version number of the target virtual machine included in the target flow entry is consistent with the second version number of the target virtual machine recorded in the local position, determining an attribute identifier of the data message;

determining, in the target flow entry, a set of actions corresponding to the attribute identifier, and forwarding the data message according to the set of actions.

In an implementation, the determining the target flow entry matched with the data message includes:

determining, according to a user identifier of the user, the target virtual machine associated with the user in the local position;

determining the at least one flow entry corresponding to the target virtual machine, and determining the target flow entry matched with the data message according to tuple data included in a header field of each flow entry.

In an implementation, the sending the data message to the centrex, so that the centrex generates the first flow entry according to the data message, includes:

sending the data message to the centrex, so that the centrex establishes a long connection data channel with a client of the user according to a client identifier of the user included in the data message, and constructs the first flow entry according to a result of establishment of the long connection data channel, where the first flow entry includes interface configuration information of the long connection data channel.

In an implementation, the sending the data message to the centrex, so that the centrex generates the second flow entry corresponding to the data message, includes:

sending the data message to the centrex, so that the centrex establishes a long connection data channel between the target host machine and a client of the user according to a client identifier of the user included in the data message, and constructs the second flow entry according to a result of establishment of the long connection data channel, where the second flow entry includes interface configuration information of the long connection data channel.

In an implementation, in the case that the first version number of the target virtual machine included in the target flow entry is consistent with the second version number of the target virtual machine recorded in the local position, it is determined that the target flow entry is hit;

accordingly, the method further includes:

counting a number of hits of the target flow entry within a target time interval;

in a case that the number of hits is less than a preset number threshold, deleting the flow entry including the first version number in the local position.

According to a second aspect of embodiments of this specification, an apparatus for controlling a flow entry is provided, including:

a receiving module, configured to receive a data message sent by a user, and determine a target flow entry matched with the data message, where the target flow entry is one of at least one flow entry corresponding to a target virtual machine in a local position;

a deleting module, configured to: in a case that a first version number of the target virtual machine included in the target flow entry is inconsistent with a second version number of the target virtual machine recorded in the local position, delete a flow entry including the first version number in the local position; and a sending module, configured to send the data message to a centrex, so that the centrex forwards the data message to a target host machine, where the second version number is generated in a case that the target virtual machine is migrated to the target host machine.

According to a third aspect of embodiments of this specification, a network interface card is provided, including:

a memory and a processor;

where the memory is configured to store computer-executable instructions, and the processor is configured to execute the computer-executable instructions to implement the steps of any one of the described methods for controlling a flow entry.

According to a fourth aspect of embodiments of this specification, a computing device is provided, including:

a memory and a processor;

where the memory is configured to store computer-executable instructions, and the processor is configured to execute the computer-executable instructions to implement the steps of any one of the described methods for controlling a flow entry.

According to a fifth aspect of embodiments of this specification, a computer-readable storage medium which stores computer-executable instructions is provided, and when the instructions are executed by a processor, the steps of any one of the described methods for controlling a flow entry are implemented.

According to a sixth aspect of embodiments of this specification, a computer program is provided, and when the computer program is executed in a computer, the computer is caused to execute the steps of the described method for controlling a flow entry.

In an embodiment of this specification, a data message sent by a user is received, and a target flow entry matched with the data message is determined, where the target flow entry is one of at least one flow entry corresponding to a target virtual machine in the local position; in a case that a first version number of the target virtual machine included in the target flow entry is inconsistent with a second version number of the target virtual machine recorded in the local position, a flow entry including the first version number in the local position is deleted; the data message is sent to a centrex, so that the centrex forwards the data message to a target host machine, where the second version number is generated in a case that the target virtual machine is migrated to the target host machine.

In the embodiments of this specification, the version number is set for the virtual machine in the local position and the version number is added to the flow entry corresponding to the virtual machine. In a case that the virtual machine is migrated, its version number may change after migration. Therefore, in the embodiments of this specification, after the data message of the user is received, the target flow entry matched with the data message is determined, and whether the target virtual machine is migrated is determined by comparing the first version number of the target virtual machine in the target flow entry with the second version number of the target virtual machine. In a case that they are compared as inconsistent, it is determined that the target virtual machine is migrated, and a forwarding path of the data message needs to be determined according to the position of the target virtual machine after migration. Specifically, the forwarding path of the data message is re-determined through the centrex, and the data message is forwarded to the target host machine according to this path. In this way, the forwarding path of the data message can be changed in time in a case that the migration of the target virtual machine is determined, so as to avoid the data message being forwarded in error, that is, to facilitate improving the accuracy of the forwarding result of the data message, thereby improving user experience.

In addition, in the case that they are compared as inconsistent, it is determined that the target virtual machine is migrated, and then flow entries including the first version number in the local position can be deleted in a batch. That is, through adding the version number of the target virtual machine to the flow entries, and determining the flow entries which need to be deleted by means of searching for the version number, it is beneficial for improving aging and deletion speed of the flow entries, and also beneficial for avoiding the problem of the data message being forwarded in error due to untimely deletion of the flow entries. That is, it is beneficial for improving the accuracy of the forwarding result of the data message, thereby improving the user experience.

DESCRIPTION OF EMBODIMENTS

Many specific details are elaborated in the following description to facilitate thorough understanding of this specification. However, this specification can be implemented in many other ways different from those described here, and those skilled in the art can make similar promotions without violating the content of this specification. Therefore, this specification is not limited by the specific implementations disclosed below.

The terms used in one or more embodiments in this specification are for the sole purpose of describing specific embodiments and are not intended to limit one or more embodiments in this specification. Unless the context clearly indicates another meaning, the singular form of "a/an/one", "said" or "the" used in one or more embodiments in this specification and in the attached claims is also intended to include the plural form. It should also be understood that the term "and/or" used in one or more embodiments in this specification refers to and includes any or all possible combinations of one or more associated items listed.

It should be understood that although terms of "first", "second" and the like may be used to describe various information in one or more embodiments in this specification, these pieces of information should not be limited to these terms. These terms are only used to distinguish information of the same type from each other. For example, without departing from the scope of one or more embodiments in this specification, "first" can also be called "second", and similarly, "second" can also be called "first". Depending on the context, the word "if" used here can be interpreted as "in a case that" or "when" or "in response to determining".

Firstly, the terminology involved in one or more embodiments in this specification is explained.

Centrex: Utilizing resources of a public network to form a dedicated network, providing a special switching function of a virtual PBX (PrivateBranchExchange, Private Branch Exchange) service for users of the public network.

In this specification, a method for controlling a flow entry is provided. This specification also involves an apparatus for controlling a flow entry, a computing device, a computer-readable storage medium and a computer program. Each of them is explained in detail in embodiments below.

Figure 1:
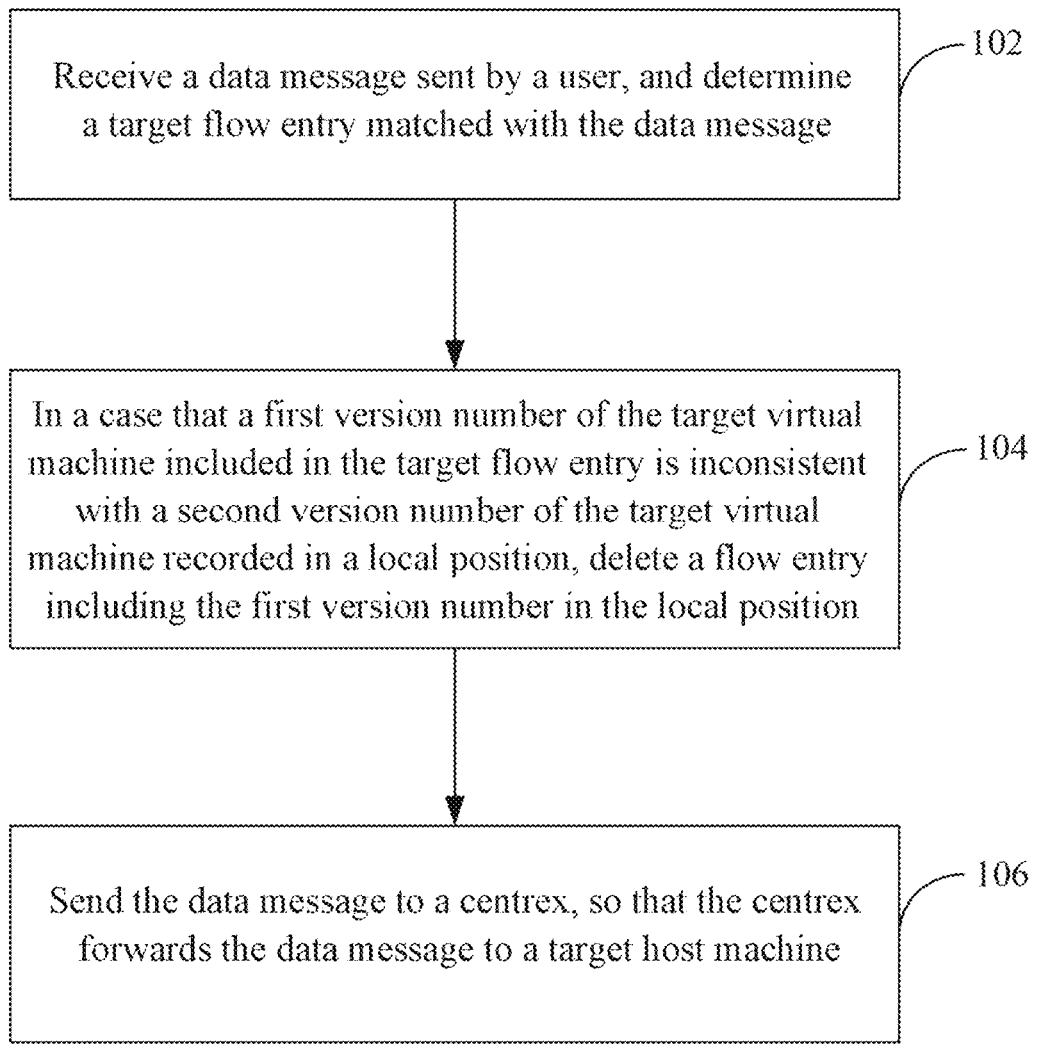
FIG. 1 is a flow chart of a method for controlling a flow entry provided by an embodiment of this specification.

FIG. 1 shows a flow chart of a method for controlling a flow entry provided according to an embodiment of this specification, which specifically includes the following steps.

Step 102, receiving a data message sent by a user, and determining a target flow entry matched with the data message, where the target flow entry is one of at least one flow entry corresponding to a target virtual machine in a local position.

The method for controlling a flow entry provided by the embodiment of this specification is applied to a source host machine, i.e., a host machine (a physical machine) in which the target virtual machine is located before migration.

In a practical application, the user has a use-permission on the target virtual machine. Therefore, a corresponding data processing need can be realized through sending the data message to the source host machine by the user and performing forwarding processing on the data message between the target virtual machine and/or other virtual machine(s).

Because the user has the use-permission on the target virtual machine, in a case of requiring to forward the data message from the target virtual machine to other virtual machine(s), a communication protocol between the target virtual machine and other virtual machine(s) may be set, and a long connection data channel is established between the virtual machines based on the communication protocol. Further, a flow entry corresponding to the target virtual machine may be generated based on the long connection data channel, and the flow entry may be used to record protocol status information of the connection between the target virtual machine and other virtual machine(s), which is established based on a target communication protocol.

Therefore, when the user accesses the target virtual machine through a client for the first time, since there is no connection established between the target virtual machine and other virtual machines, in this case, if the data message of the user is received, the target flow entry matched with the data message cannot be found, thereby message forwarding cannot be implemented through the target virtual machine. Therefore, in a case that the target flow entry matched with the data message is not found, the data message is sent to a centrex, so that the centrex generates a first flow entry according to the data message.

A first version number is added to the first flow entry.

Further, sending the data message to the centrex, so that the centrex generates the first flow entry according to the data message, includes:

sending the data message to the centrex, so that the centrex establishes a long connection data channel with a client of the user according to a client identifier of the user included in the data message, and constructs the first flow entry according to a result of establishment of the long connection data channel, where the first flow entry includes interface configuration information of the long connection data channel.

Specifically, not only the virtual machine but also the centrex run on the host machine, where the centrex can be responsible for simulating a physical switch to perform traffic (data messages) forwarding. Usually, after entering the host machine, the data message first passes through an intelligent network interface card, and the intelligent network interface card queries a flow table to determine the target flow entry hit by the data message. If the data message hits the target flow entry, then message forwarding may be performed according to a set of actions in the target flow entry. If the data message does not hit the target flow entry, then the data message may be sent to the centrex. The first flow entry corresponding to the data message is generated by the centrex, and the data message is forwarded according to the generated first flow entry. The generated first flow entry is delivered to the intelligent network interface card, so that a subsequent data message can directly hit the first flow entry of the target virtual machine to perform forwarding processing.

The interface configuration information may be target communication protocol information between the client of the user and the source host machine, or between the client of the user and the target virtual machine, or between the target virtual machine and other virtual machine(s).

In a practical application, in the case that the target flow entry matched with the data message is not found, the data message may be sent to the centrex, so that the centrex establishes a long connection data channel between the source host machine and the client of the user according to the client identifier of the user included in the data message, or establishes a long connection data channel between the target virtual machine in the source host machine and the client of the user according to the client identifier of the user included in the data message, or determines, according to the client identifier, the target virtual machine on which the user has the use-permission, so as to establish a long connection data channel between the target virtual machine and other virtual machine(s).

It should be noted that depending on the specific scenario, the recipient of the data message may be different when performing forwarding processing on the data message according to the target flow entry. For example, for a load balancing scenario, performing the forwarding processing on the data message according to the target flow entry may specifically be forwarding the data message to a destination virtual machine in a virtual machine cluster, or to a destination server in a server cluster. For another example, for a network forwarding scenario, performing the forwarding processing on the data message according to the target flow entry may specifically be forwarding the data message to a next-level data message forwarding device (the centrex or the destination virtual machine) or a destination device for the data message.

In addition, before receiving the data message sent by the user, the first version number of the target virtual machine may be generated and the first version number may be added to the at least one flow entry;

in a case that it is determined that the target virtual machine is migrated from the local position to a target host machine, a second version number of the target virtual machine after migration is recorded.

Specifically, each time after receiving a data message, it is necessary to determine the target flow entry matched with the data message in at least one flow entry corresponding to the target virtual machine, thereby forwarding processing is performed on the data message based on a set of actions recorded in the target flow entry. Specifically, a forwarding path of the data message may be determined according to the set of actions, and the forwarding processing can be performed on the data message according to this forwarding path. However, in a case that the target virtual machine is migrated, the forwarding path corresponding to the data message may change since the position of the target virtual machine changes before and after the migration. In this situation, if the set of actions in the target flow entry is still followed for message forwarding, then it may be caused that the data message is forwarded in error.

Based on this, in the embodiment of this specification, a corresponding version number is set for each virtual machine within the source host machine, i.e., the first version number is set for the target virtual machine, and the first version number is added to at least one flow entry corresponding to the target virtual machine. Then in the case that it is determined that the target virtual machine is migrated, i.e., in the case that the target virtual machine is migrated from the source host machine in the local position to the target host machine, the second version number may be set again for the target host machine after migration, where the second version number may be set by the source host machine or the target host machine, and after the setting, the second version number is recorded by the source host machine.

After the data message of the user is received and the target flow entry matched with the data message is determined, the first version number in the target flow entry may be compared with the second version number recorded in the local position, and whether the target virtual machine is migrated is determined according to a comparison result, so as to ensure that the forwarding path of the data message can be determined again in the case that it is determined that the target virtual machine is migrated, thereby avoiding the data message being forwarded in error.

In a specific implementation, the determining the target flow entry matched with the data message includes:

determining, according to a user identifier of the user, the target virtual machine associated with the user in the local position;

determining the at least one flow entry corresponding to the target virtual machine, and determining the target flow entry matched with the data message according to tuple data included in a header field of each flow entry.

Specifically, each target virtual machine may correspond to a plurality of flow tables, and each flow table may be formed by a plurality of flow entries, which is a key data structure for the virtual machine or the centrex to control data message forwarding. The virtual machine or the centrex decides to take an appropriate action on the received data message by searching the flow entries in the flow tables. Each flow entry includes three fields: a header field, a counter field and an action field. The header field is used to be matched with a header content of the data message received by the virtual machine or the centrex. Generally, the header field of the flow entry includes 12-tuple, which specifically is: an input interface, a mac source address, a mac destination address, an Ethernet type, a virtual ID, a virtual priority, an IP source address, an IP target address, an IP protocol, an IP TOS bit, a TCP/UDP destination port, and a source port. The counter field is used to count some information of traffic, for example the number of sent packets. The action field is a processing method after the centrex receives the data message, such as discarding, forwarding to a port, etc.

Therefore, after receiving the data message sent by the user, the target virtual machine associated with the user in the local position may be determined according to the user identifier of the user, and then matching with the header of the data message is performed according to tuple data contained in the header field of the flow entry corresponding to the target virtual machine. If information contained in the header of the data message is consistent, or the same, with the tuple data contained in the header field of a flow entry, then this flow entry is determined as the target flow entry matched with the data message, and the target flow entry is one of at least one flow entry corresponding to the target virtual machine.

Step 104, in a case that the first version number of the target virtual machine included in the target flow entry is inconsistent with the second version number of the target virtual machine recorded in the local position, deleting a flow entry including the first version number in the local position.

Specifically, in the case that the target virtual machine is not migrated, the second version number and the first version number both can characterize the version number set by the source host machine for the target virtual machine before migration; in the case that the target virtual machine is migrated, the first version number can characterize the version number set by the source host machine for the target virtual machine before migration, and the second version number is the version number set by the source host machine or the target host machine for the target virtual machine after migration.

After the source host machine determines the version number of each virtual machine, in addition to recording version numbers of different virtual machines in the local position, the version numbers may be further added into the flow tables corresponding to the virtual machines. In the case that the target virtual machine is migrated, the version number recorded in the local position may be updated accordingly, but the version number added into the flow table corresponding to the virtual machine will not be updated.

Therefore, after the data message of the user is received and the target flow entry matched with the data message is determined, the first version number in the target flow entry may be compared with the second version number recorded in the local position. In a case that they are compared as inconsistent, it is represented that the target virtual machine is migrated. In this case, since the position of the target virtual machine changes, the forwarding path of the data message may change accordingly. Based on this, the forward path recorded in the flow entry which corresponds to the target virtual machine and stored in the local position by the source host machine is still the forward path of the data message before the target virtual machine is migrated, thus, if this forward path is still followed to forward the data message, then an error in forwarding the data message may be resulted in. Therefore, in the case that it is determined that the target virtual machine is migrated, deletion processing (flow table aging) may be performed on the flow entry including the first version number in the local position.

In addition, in a case that the first version number of the target virtual machine included in the target flow entry is consistent with the second version number of the target virtual machine recorded in the local position, an attribute identifier of the data message is determined;

a set of actions corresponding to the attribute identifier is determined in the target flow entry, and the data message is forwarded according to the set of actions.

Specifically, in the case that the first version number of the target virtual machine included in the target flow entry is consistent with the second version number of the target virtual machine recorded in the local position, it is represented that the target virtual machine is not migrated. In this case, the attribute identifier of the data message may be determined, and the set of actions corresponding to the attribute identifier in the target flow entry may be determined. Then the data message is forwarded according to the set of actions.

As described above, the target flow entry contains the action field, and an action contained in the action field includes but is not limited to forwarding or discarding, etc. Therefore, in the case that it is determined that the target virtual machine is not migrated, that is, it is determined that the forwarding path of the data message does not change, a set of actions contained in the target flow entry may be determined directly, and then the set of actions corresponding to the data message is determined according to the attribute identifier of the data message, i.e., to determine whether the data message should be discarded or forwarded according to the attribute identifier. In a case that the set of actions corresponding to the data message is determined as forwarding, forwarding processing is performed on the data message.

In a specific implementation, in the case that the first version number of the target virtual machine included in the target flow entry is consistent with the second version number of the target virtual machine recorded in the local position, it is determined that the target flow entry is hit;

accordingly, the source host machine may further count a number of hits of the target flow entry within a target time interval;

in a case that the number of hits is less than a preset number threshold, the flow entry including the first version number in the local position is deleted.

Specifically, since the second version number can be used to characterize the version number set for the target virtual machine again after the target virtual machine is migrated, the second version number is different from the first version number if the target virtual machine has been migrated, in this case, the first version number of the target virtual machine included in the target flow entry and the second version number of the target virtual machine recorded in the local position are compared as inconsistent, that is, the target flow entry is not hit. It can be seen that if the target flow entry of the target virtual machine in the local position is not hit for a long time, the reason may be that the target virtual machine has been migrated.

Therefore, in the embodiment of this specification, the number of hits of the target flow entry within the target time interval may be counted. If the number of hits is less than the preset number threshold within the target time interval (the preset number threshold may be set to 0), it means that the target virtual machine has been migrated. In this case, flow entries including the first version number in the local position may be deleted in a batch.

Compared with the above flow table aging manner of deleting the target flow entry including the first version number in the local position in the case that the first version number of the target virtual machine included in the target flow entry is inconsistent with the second version number of the target virtual machine recorded in the local position, the flow entry including the first version number is deleted in the case that it is determined that the target flow entry is not hit within a certain period of time, which is beneficial for avoiding mistakenly deleting the flow entry, and thus beneficial for improving the reliability and security of system.

Step 106, sending the data message to the centrex, so that the centrex forwards the data message to the target host machine, where the second version number is generated in a case that the target virtual machine is migrated to the target host machine.

In a specific implementation, in the case that the first version number of the target virtual machine included in the target flow entry is inconsistent with the second version number of the target virtual machine recorded in the local position, the data message is sent to the centrex, so that the centrex generates a second flow entry corresponding to the data message;

the second version number is added to the second flow entry, forwarding processing is performed on the data message according to the second flow entry, and the second flow entry is delivered to the target host machine.

Further, sending the data message to the centrex, so that the centrex generates the second flow entry corresponding to the data message, includes:

sending the data message to the centrex, so that the centrex establishes a long connection data channel between the target host machine and the client of the user according to the client identifier of the user included in the data message, and constructs the second flow entry according to a result of establishment of the long connection data channel, where the second flow entry includes interface configuration information of the long connection data channel.

Specifically, the second version number can be used to characterize a new version number set for the target virtual machine after the target virtual machine is migrated. That is, in the case that the target virtual machine is migrated from the source host machine (the local position) to the target host machine, the second version number may be set for the target host machine by the source host machine or the target host machine.

Additionally, as mentioned above, not only the virtual machine but also the centrex run on the host machine, where the centrex can be responsible for simulating the physical switch to perform traffic (data messages) forwarding. Usually, after entering the host machine, the data message first passes through the intelligent network interface card, and the intelligent network interface card queries the flow table to determine the target flow entry hit by the data message. If the data message hits the target flow entry, then the first version number in the target flow entry may be compared with the second version number recorded in the local position. If they are compared as inconsistent, then the data message may be sent to the centrex. The second flow entry corresponding to the data message is generated by the centrex, and the data message is forwarded to the target host machine according to the generated second flow entry. The generated second flow entry is delivered to the target host machine, i.e., delivered to the intelligent network interface card of the target host machine, so that the subsequent data message can directly hit the second flow entry of the target virtual machine to perform forwarding processing.

The interface configuration information may be target communication protocol information between the client of the user and the target host machine, or between the client of the user and the target virtual machine, or between the target virtual machine and other virtual machine(s).

In a practical application, in the case that the first version number of the target virtual machine included in the target flow entry is inconsistent with the second version number of the target virtual machine recorded in the local position, the data message may be sent to the centrex, so that the centrex establishes a long connection data channel between the target host machine and the client of the user according to the client identifier of the user included in the data message, or establishes a long connection data channel between the target virtual machine in the target host machine and the client of the user according to the client identifier of the user included in the data message, or determines, according to the client identifier, the target virtual machine on which the user has the use-permission, so as to establish a long connection data channel between the target virtual machine and other virtual machine(s).

It should be noted that depending on the specific scenario, the recipient of the data message may be different when performing forwarding processing on the data message according to the second flow entry. For example, for the load balancing scenario, performing the forwarding processing on the data message according to the second flow entry may specifically be forwarding the data message to the destination virtual machine in the virtual machine cluster, or to the destination server in the server cluster. For another example, for the network forwarding scenario, performing the forwarding processing on the data message according to the second flow entry may specifically be forwarding the data message to the next-level data message forwarding device (the centrex or the destination virtual machine) or the destination device for the data message.

Figure 2:
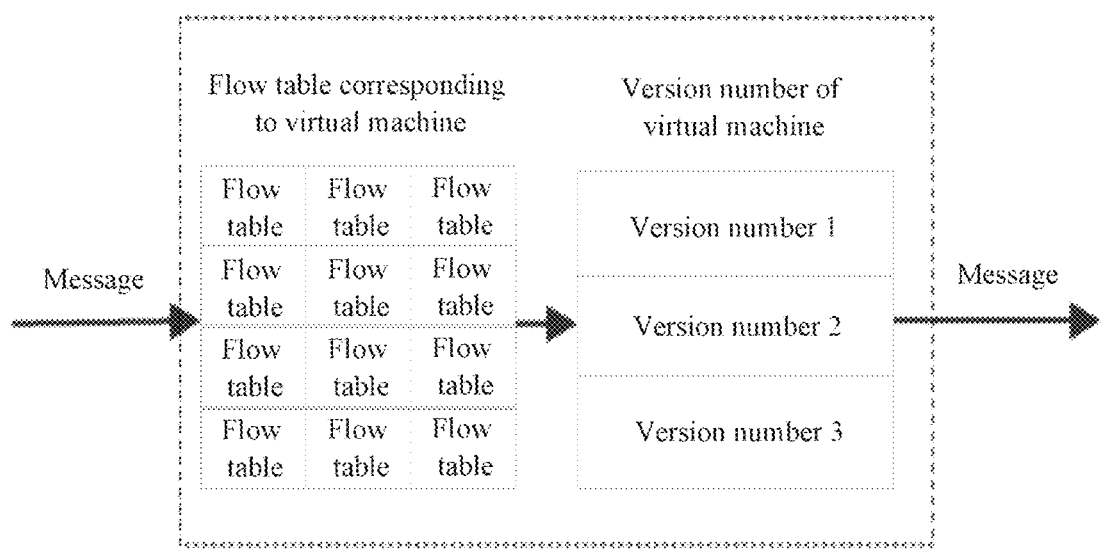
FIG. 2 is a schematic diagram of a procedure of processing a flow entry provided by an embodiment of this specification.

A schematic diagram of a procedure of processing a flow entry provided by an embodiment of this specification is shown in FIG. 2. The source host machine may set different version numbers for respective virtual machines within the source host machine. Different virtual machines correspond to different flow tables, and each flow table may contain a plurality of flow entries. Therefore, after determining the version number of each virtual machine, in addition to recording version numbers of different virtual machines in the local position, the version numbers may be further added into the flow tables corresponding to the virtual machines. In the case that the target virtual machine is migrated, the version number recorded in the local position may be updated accordingly, but the version number added into the flow entry corresponding to the virtual machine will not be updated.

Therefore, after receiving the data message of the user, the source host machine may determine, through message header information of the data message, the target flow entry matched with the data message in at least one flow entry corresponding to the target virtual machine, and then compares the first version number included in the target flow entry with the second version number of the target virtual machine recorded in the local position.

In a case that they are compared as consistent, the set of actions corresponding to the data message in the target flow entry is determined, and the data message is forwarded according to the set of actions;

in a case that they are compared as inconsistent, the data message is sent to the centrex, so that the centrex generates the second flow entry corresponding to the data message, and then the centrex adds the second version number to the second flow entry, performs forwarding processing on the data message according to the second flow entry, and delivers the second flow entry to the target host machine.

In an embodiment of this specification, a data message sent by a user is received, and a target flow entry matched with the data message is determined, where the target flow entry is one of at least one flow entry corresponding to a target virtual machine in a local position; in a case that a first version number of the target virtual machine included in the target flow entry is inconsistent with a second version number of the target virtual machine recorded in the local position, a flow entry including the first version number in the local position is deleted; the data message is sent to a centrex, so that the centrex forwards the data message to a target host machine, where the second version number is generated in a case that the target virtual machine is migrated to the target host machine.

In the embodiments of this specification, the version number is set for the virtual machine in the local position and the version number is added to the flow entry corresponding to the virtual machine. In a case that the virtual machine is migrated, its version number may change after migration. Therefore, in the embodiments of this specification, after the data message of the user is received, the target flow entry matched with the data message is determined, and whether the target virtual machine is migrated is determined by comparing the first version number of the target virtual machine in the target flow entry with the second version number of the target virtual machine. In a case that they are compared as inconsistent, it is determined that the target virtual machine is migrated, and a forwarding path of the data message needs to be determined according to the position of the target virtual machine after migration. Specifically, the forwarding path of the data message is re-determined through the centrex, and the data message is forwarded to the target host machine according to this path. In this way, the forwarding path of the data message can be changed in time in a case that the migration of the target virtual machine is determined, so as to avoid the data message being forwarded in error, that is, to facilitate improving the accuracy of the forwarding result of the data message, thereby improving user experience.

In addition, in the case that they are compared as inconsistent, it is determined that the target virtual machine is migrated, and then flow entries including the first version number in the local position can be deleted in a batch. That is, through adding the version number of the target virtual machine to the flow entries, and determining the flow entries which need to be deleted by means of searching for the version number, it is beneficial for improving aging and deletion speed of the flow entries, and also beneficial for avoiding the problem of the data message being forwarded in error due to untimely deletion of the flow entries. That is, it is beneficial for improving the accuracy of the forwarding result of the data message, thereby improving the user experience.

Figure 3:
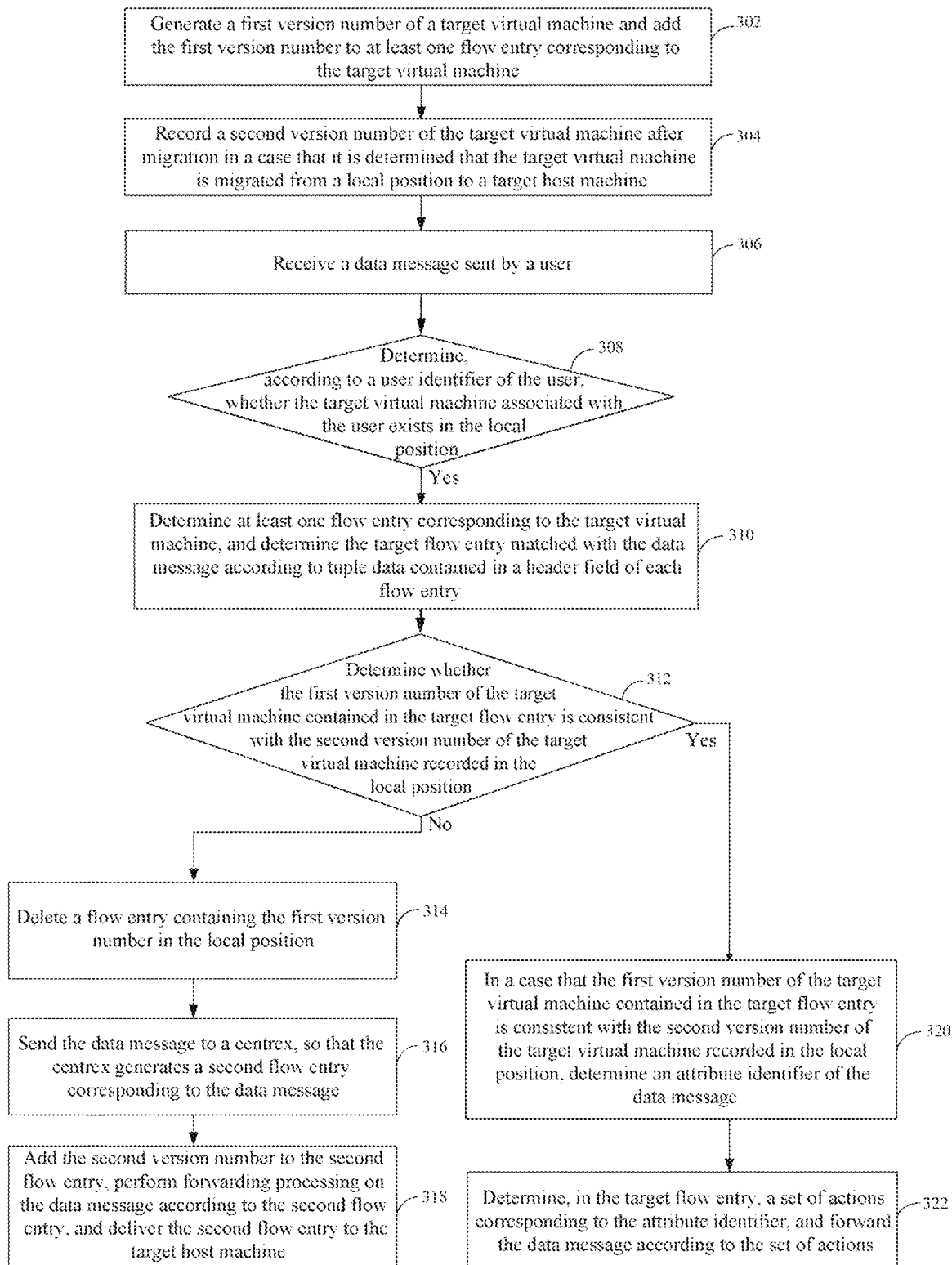
FIG. 3 is a flow chart of a processing procedure of a method for controlling a flow entry provided by an embodiment of this specification.

In the following, the method for controlling a flow entry is further described with reference to FIG. 3 by taking an application of the method for controlling a flow entry provided in this specification in an actual scenario as an example. FIG. 3 shows a flow chart of a processing procedure of a method for controlling a flow entry provided by an embodiment of this specification, which specifically includes the following steps.

Step 302, generating a first version number of a target virtual machine and adding the first version number to at least one flow entry corresponding to the target virtual machine.

Step 304, recording a second version number of the target virtual machine after migration in a case that it is determined that the target virtual machine is migrated from a local position to a target host machine.

Step 306, receiving a data message sent by a user.

Step 308, determining, according to a user identifier of the user, whether the target virtual machine associated with the user exists in the local position.

If yes, then execute step 310; if no, then send the data message to a centrex, so that the centrex establishes a long connection data channel with a client of the user according to a client identifier of the user contained in the data message.

Step 310, determining at least one flow entry corresponding to the target virtual machine, and determining the target flow entry matched with the data message according to tuple data contained in a header field of each flow entry.

The target flow entry is one of at least one flow entry corresponding to the target virtual machine in the local position.

Step 312, determining whether the first version number of the target virtual machine contained in the target flow entry is consistent with the second version number of the target virtual machine recorded in the local position.

If no, then execute step 314; if yes, then execute step 320.

Step 314, deleting a flow entry containing the first version number in the local position.

Step 316, sending the data message to the centrex, so that the centrex generates a second flow entry corresponding to the data message.

Step 318, adding the second version number to the second flow entry, performing forwarding processing on the data message according to the second flow entry, and delivering the second flow entry to the target host machine.

In a case that the target virtual machine is not migrated, the second version number and the first version number both can characterize the version number set by a source host machine for the target virtual machine before migration; in a case that the target virtual machine is migrated, the first version number can characterize the version number set by the source host machine for the target virtual machine before migration, and the second version number is the version number set by the source host machine or the target host machine for the target virtual machine after migration.

Step 320, in a case that the first version number of the target virtual machine contained in the target flow entry is consistent with the second version number of the target virtual machine recorded in the local position, determining an attribute identifier of the data message.

Step 322, determining, in the target flow entry, a set of actions corresponding to the attribute identifier, and forwarding the data message according to the set of actions.

In addition, in a case that the target flow entry matched with the data message is not found, the data message is sent to the centrex, so that the centrex establishes the long connection data channel with the client of the user according to the client identifier of the user contained in the data message.

A first flow entry is constructed according to a result of establishment of the long connection data channel.

The first flow entry contains interface configuration information of the long connection data channel.

The first version number is added to the first flow entry. The first flow entry is sent to the target virtual machine, and the data message is forwarded based on the set of actions contained in the first flow entry.

In the embodiments of this specification, the version number is set for the virtual machine in the local position and the version number is added to the flow entry corresponding to the virtual machine. In a case that the virtual machine is migrated, its version number may change after migration. Therefore, in the embodiments of this specification, after the data message of the user is received, the target flow entry matched with the data message is determined, and whether the target virtual machine is migrated is determined by comparing the first version number of the target virtual machine in the target flow entry with the second version number of the target virtual machine. In a case that they are compared as inconsistent, it is determined that the target virtual machine is migrated, and a forwarding path of the data message needs to be determined according to the position of the target virtual machine after migration. Specifically, the forwarding path of the data message is re-determined through the centrex, and the data message is forwarded to the target host machine according to this path. In this way, the forwarding path of the data message can be changed in time in a case that the migration of the target virtual machine is determined, so as to avoid the data message being forwarded in error, that is, to facilitate improving the accuracy of the forwarding result of the data message, thereby improving user experience.

In addition, in the case that they are compared as inconsistent, it is determined that the target virtual machine is migrated, and then flow entries including the first version number in the local position can be deleted in a batch. That is, through adding the version number of the target virtual machine to the flow entries, and determining the flow entries which need to be deleted by means of searching for the version number, it is beneficial for improving aging and deletion speed of the flow entries, and also beneficial for avoiding the problem of the data message being forwarded in error due to untimely deletion of the flow entries. That is, it is beneficial for improving the accuracy of the forwarding result of the data message, thereby improving the user experience.

Figure 4:
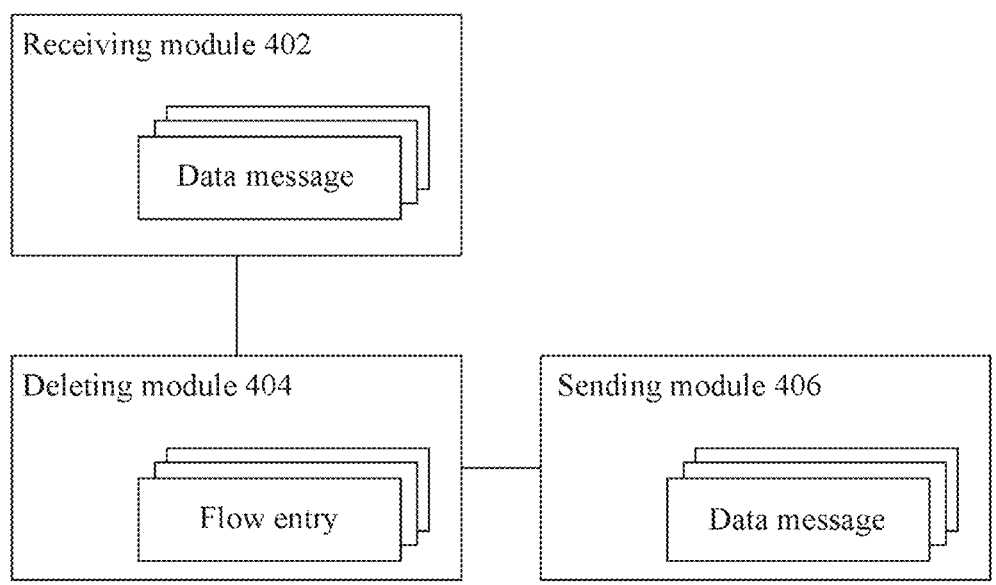
FIG. 4 is a schematic structural diagram of an apparatus for controlling a flow entry provided by an embodiment of this specification.

Corresponding to the above method embodiments, this specification further provides embodiments of an apparatus for controlling a flow entry. FIG. 4 shows a schematic structural diagram of an apparatus for controlling a flow entry provided by an embodiment of this specification. As shown in FIG. 4, the apparatus includes:

- a receiving module 402, configured to receive a data message sent by a user, and determine a target flow entry matched with the data message, where the target flow entry is one of at least one flow entry corresponding to a target virtual machine in a local position;
- a deleting module 404, configured to: in a case that a first version number of the target virtual machine included in the target flow entry is inconsistent with a second version number of the target virtual machine recorded in the local position, delete the flow entry including the first version number in the local position; and,
- a sending module 406, configured to send the data message to a centrex, so that the centrex forwards the data message to a target host machine, where the second version number is generated in a case that the target virtual machine is migrated to the target host machine.

In an implementation, the apparatus for controlling a flow entry further includes a recording module, configured to:

generate the first version number of the target virtual machine and add the first version number to the at least one flow entry;

record the second version number of the target virtual machine after migration in a case that it is determined that the target virtual machine is migrated from the local position to the target host machine.

In an implementation, the apparatus for controlling a flow entry further includes a first processing module, configured to:

in a case that the target flow entry matched with the data message is not found, send the data message to the centrex, so that the centrex generates a first flow entry according to the data message;

add the first version number to the first flow entry.

In an implementation, the apparatus for controlling a flow entry further includes a second processing module, configured to:

in the case that the first version number of the target virtual machine included in the target flow entry is inconsistent with the second version number of the target virtual machine recorded in the local position, send the data message to the centrex, so that the centrex generates a second flow entry corresponding to the data message;

add the second version number to the second flow entry, perform forwarding processing on the data message according to the second flow entry, and deliver the second flow entry to the target host machine.

In an implementation, the apparatus for controlling a flow entry further includes a forwarding module, configured to:

in a case that the first version number of the target virtual machine included in the target flow entry is consistent with the second version number of the target virtual machine recorded in the local position, determine an attribute identifier of the data message;

determine, in the target flow entry, a set of actions corresponding to the attribute identifier, and forward the data message according to the set of actions.

In an implementation, the receiving module 402 is further configured to:

determine, according to a user identifier of the user, the target virtual machine associated with the user in the local position;

determine the at least one flow entry corresponding to the target virtual machine, and determine the target flow entry matched with the data message according to tuple data included in a header field of each flow entry.

In an implementation, the first processing module is further configured to:

send the data message to the centrex, so that the centrex establishes a long connection data channel with a client of the user according to a client identifier of the user included in the data message, and constructs the first flow entry according to a result of establishment of the long connection data channel, where the first flow entry includes interface configuration information of the long connection data channel.

In an implementation, the second processing module is configured to:

send the data message to the centrex, so that the centrex establishes a long connection data channel between the target host machine and a client of the user according to a client identifier of the user included in the data message, and constructs the second flow entry according to a result of establishment of the long connection data channel, where the second flow entry includes interface configuration information of the long connection data channel.

In an implementation, in the case that the first version number of the target virtual machine included in the target flow entry is consistent with the second version number of the target virtual machine recorded in the local position, it is determined that the target flow entry is hit;

accordingly, the apparatus further includes a statistics module, configured to:

count a number of hits of the target flow entry within a target time interval;

in a case that the number of hits is less than a preset number threshold, the flow entry including the first version number in the local position is deleted.

The above are schematic solutions of the apparatus for controlling a flow entry of the embodiment. It should be noted that the technical solutions of the apparatus for controlling a flow entry and the above technical solutions of the method for controlling a flow entry belong to the same concept, and detailed contents not described in detail for the technical solutions of the apparatus for controlling a flow entry may be found in the description of the above technical solutions of the method for controlling a flow entry.

Figure 5:
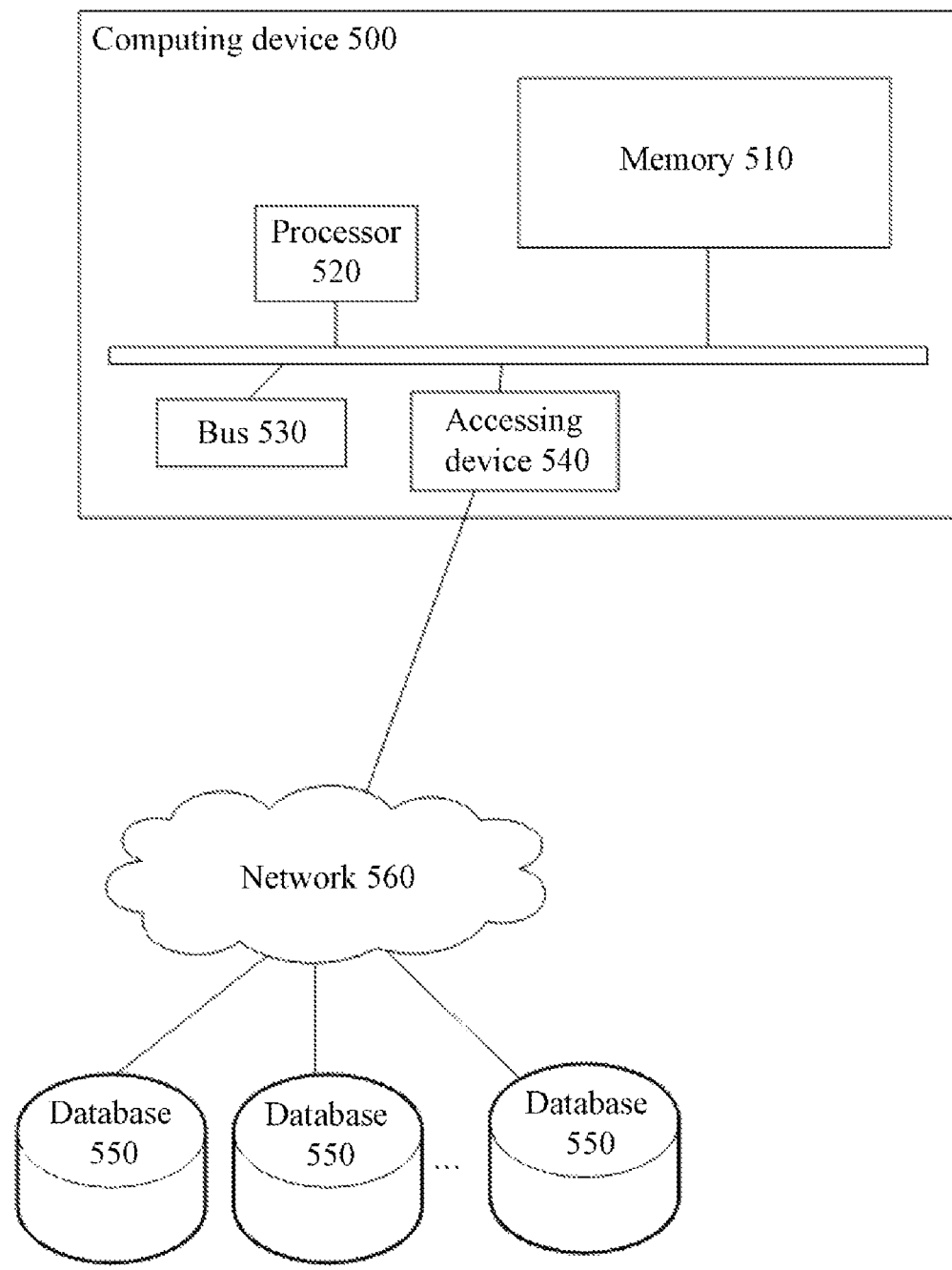
FIG. 5 is a structural block diagram of a computing device provided by an embodiment of this specification.

FIG. 5 shows a structural block diagram of a computing device 500 provided according to an embodiment of this specification. Components of the computing device 500 include but are not limited to a memory 510 and a processor 520. The processor 520 is connected to the memory 510 via a bus 530, and a database 550 is configured to store data.

The computing device 500 further includes an accessing device 540, and the accessing device 540 enables the computing device 500 to conduct communication via one or more networks 560. Examples of such networks include combinations of a public switched telephone network (PSTN), a local area network (LAN), a wide area network (WAN), a personal area network (PAN), or a communication network such as Internet. The accessing device 540 may include one or more wired or wireless network interfaces (for example, a network interface card (NIC)) in any type, such as an IEEE 802.11 wireless local area network (WLAN) wireless interface, a world interoperability for microwave access (Wi-MAX) interface, an Ethernet interface, a universal serial bus (USB) interface, a cellular network interface, a Bluetooth interface, a near field communication (NFC) interface, etc.

In an embodiment of this specification, the above components of the computing device 500 and other components not shown in FIG. 5 may also be connected to each other, for example via a bus. It should be understood that the structural block diagram of the computing device shown in FIG. 5 is only for the purpose of illustration, rather than limiting the scope of this specification. Those skilled in the art may add or replace components as needed.

The computing device 500 may be any type of stationary or mobile computing device, including a mobile computer or a mobile computing device (for example, a tablet computer, a personal digital assistant, a laptop computer, a notebook computer, a netbook, etc.), a mobile phone (for example, a smartphone), a wearable computing device (for example, a smartwatch, smart glasses, etc.) or other types of mobile devices, or a stationary computing device such as a desktop computer or a PC. The computing device 500 may also be a mobile or stationary server.

The processor 520 is configured to execute computer-executable instructions, and when the computer-executable instructions are executed by the processor, the above steps of the method for controlling a flow entry are implemented.

The above are schematic solutions of the computing device of the embodiment. It should be noted that the technical solutions of the computing device and the above technical solutions of the method for controlling a flow entry belong to the same concept, and detailed contents not described in detail for the technical solutions of the computing device may be found in the description of the above technical solutions of the method for controlling a flow entry.

In an embodiment of this specification, a computer-readable storage medium which stores computer-executable instructions is provided, and when the computer-executable instructions are executed by a processor, the above steps of the method for controlling a flow entry are implemented.

The above is a schematic solution of the computer-readable storage medium of the embodiment. It should be noted that the technical solution of the storage medium and the above technical solutions of the method for controlling a flow entry belong to the same concept, and detailed contents not described in detail for the technical solution of the storage medium may be found in the description of the above technical solutions of the method for controlling a flow entry.

In an embodiment of this specification, a computer program is provided, and when the computer program is executed in a computer, the computer is caused to execute the above steps of the method for controlling a flow entry.

The above is a schematic solution of the computer program of the embodiment. It should be noted that the technical solution of the computer program and the above technical solutions of the method for controlling a flow entry belong to the same concept, and detailed contents not described in detail for the technical solution of the computer program may be found in the description of the above technical solutions of the method for controlling a flow entry.

In an embodiment of this specification, a network interface card is provided, including a memory and a processor, where the memory stores computer-executable instructions, the processor is configured to execute the computer-executable instructions, and when the computer-executable instructions are executed by the processor, the above steps of the method for controlling a flow entry are implemented.

The above is a schematic solution of the network interface card of the embodiment. It should be noted that the technical solution of the network interface card and the above technical solutions of the method for controlling a flow entry belong to the same concept, and detailed contents not described in detail for the technical solution of the network interface card may be found in the description of the above technical solutions of the method for controlling a flow entry.

Specific embodiments of this specification are described above. Other embodiments are within the scope of the attached claims. In some situations, the actions or steps recited in the claims may be executed in a different order from that in the embodiments and may still realize the desired results. In addition, a process depicted in an accompanying drawing does not necessarily follow the shown particular order or sequential order to realize the desired result. In some implementations, multitasking and parallel processing are also possible or may be advantageous.

The computer instructions include computer program code, and the computer program code may be in a form of source code, a form of object code, an executable file, or some intermediate forms, etc. The computer-readable medium may include: any entity or apparatus, record medium, USB flash drive, mobile hard drive, magnetic disk, optical disk, computer memory, read-only memory (ROM, Read Only Memory), random access memory (RAM, Random Access Memory), electrical carrier signal, telecommunications signal, software distribution medium or the like, which is capable of carrying the computer program code. It should be noted that the content contained in the computer-readable medium may be added or reduced appropriately according to a requirement of legislation and patent practice in jurisdictions. For example in some jurisdictions, according to legislation and patent practice, a computer-readable medium does not include an electrical carrier signal and a telecommunications signal.

It should be noted that for the aforementioned method embodiments, in order to simplify the description, they are all expressed as a combination of a series of actions. However, those skilled in the art should be aware that the embodiments of this specification are not limited by the described action order, because according to the embodiments of this specification, some steps may be carried out in other order or performed simultaneously. Secondly, those skilled in the art should also be aware that the embodiments described in the specification belong to preferred embodiments, and actions and modules involved may not necessarily be necessary for the embodiments of this specification.

In the above embodiments, the description of each embodiment has its own emphasis. For a part that is not detailed in an embodiment, please refer to a relevant description of other embodiments.

The above disclosed preferred embodiments of this specification are only used to help explain this specification. Details of the optional embodiments are not fully described, and the disclosure is not limited to only the described specific implementations. Obviously, there are many modifications and changes that may be made according to the content of the embodiments of this specification. These embodiments selected and specifically described in this specification are for a better explanation of the principles and practical applications of the embodiments of this specification, so that those skilled in the art can well understand and utilize this specification. This specification is only limited by the claims and their full scope and equivalents.

The invention claimed is:

1. A method for controlling a flow entry applied to a source host machine in which a target virtual machine is located before the target virtual machine is migrated to a target host machine, comprising:
   receiving a data message sent by a user;
   determining a target flow entry that is matched with the data message,
      wherein the target flow entry is one of at least one flow entry corresponding to the target virtual machine in the source host machine,
      wherein a first version number of the target virtual machine is in the target flow entry, and
      wherein, in response to the target virtual machine being migrated to the target host machine, a second version number of the target virtual machine is generated; and
   in response to the first version number of the target virtual machine in the target flow entry being inconsistent with the second version number of the target virtual machine recorded in the source host machine:
      deleting a flow entry comprising the first version number in the source host machine, and
      sending the data message to the target host machine through a virtual switch on the source host machine.

2. The method according to claim 1, further comprising:
   before receiving the data message sent by the user, generating the first version number of the target virtual machine and adding the first version number to the at least one flow entry;
   determining that the target virtual machine is migrated from the source host machine to the target host machine; and
   in response to determining that the target virtual machine is migrated from the source host machine to the target host machine, recording the second version number of the target virtual machine after migration.

3. The method for according to claim 1, further comprising:
   in response to the target flow entry that is matched with the data message not being found:
      generating a first flow entry according to the data message through the virtual switch, and
      adding the first version number to the first flow entry.

4. The method according to claim 3, wherein the generating the first flow entry according to the data message through the virtual switch comprises:
   establishing a long connection data channel with a client of the user according to a client identifier of the user comprised in the data message through the virtual switch, and
   constructing the first flow entry according to a result of establishment of the long connection data channel through the virtual switch, wherein the first flow entry comprises interface configuration information of the long connection data channel.

5. The method according to claim 1, further comprising:
   in response to the first version number of the target virtual machine in the target flow entry being inconsistent with the second version number of the target virtual machine recorded in the source host machine:
      generating a second flow entry corresponding to the data message through the virtual switch,
      adding the second version number to the second flow entry through the virtual switch,
      performing forwarding processing on the data message according to the second flow entry through the virtual switch, and
      delivering the second flow entry to the target host machine through the virtual switch.

6. The method according to claim 5, wherein the generating the second flow entry corresponding to the data message through the virtual switch comprises:
   establishing a long connection data channel between the target host machine and a client of the user according to a client identifier of the user comprised in the data message through the virtual switch, and
   constructing the second flow entry according to a result of establishment of the long connection data channel through the virtual switch, wherein the second flow entry comprises interface configuration information of the long connection data channel.

7. The method according to claim 1, further comprising:
   in response to the first version number of the target virtual machine in the target flow entry being consistent with the second version number of the target virtual machine recorded in the source host machine:
      determining an attribute identifier of the data message,
      determining, in the target flow entry, a set of actions corresponding to the attribute identifier, and
      forwarding the data message according to the set of actions.

8. The method according to claim 1, wherein the determining the target flow entry that is matched with the data message comprises:
   determining, according to a user identifier of the user, the target virtual machine associated with the user in the source host machine,
   determining the at least one flow entry corresponding to the target virtual machine, and
   determining the target flow entry that is matched with the data message according to tuple data comprised in a header field of each flow entry.

9. The method according to claim 1, wherein, in response to the first version number of the target virtual machine comprised in the target flow entry being consistent with the second version number of the target virtual machine recorded in the source host machine, determining that the target flow entry is a hit; and
   in response to the target flow entry being a hit, the method further comprises:
      counting a number of hits of the target flow entry within a target time interval, and in response to the number of hits being less than a preset number threshold, deleting the flow entry comprising the first version number in the source host machine.

10. A non-transitory computer-readable storage medium, having computer-executable instructions stored thereon, wherein in response to the computer-executable instructions being executed by a processor, the steps of the method according to claim 1 are implemented.

11. A network interface card in a source host machine in which a target virtual machine is located before the target virtual machine is migrated to a target host machine, comprising:
a memory and a processor,
wherein the memory is configured to store computer-executable instructions,
wherein the processor is configured to execute the computer-executable instructions, and
wherein, in response to the computer-executable instructions being executed by the processor, the processor is configured to:
receive a data message sent by a user, and
determine a target flow entry that is matched with the data message,
wherein the target flow entry is one of at least one flow entry corresponding to the target virtual machine in the source host machine,
wherein a first version number of the target virtual machine is in the target flow entry,
wherein, in response to the target virtual machine being migrated to the target host machine, a second version number of the target virtual machine is generated, and
wherein, in response to the first version number of the target virtual machine in the target flow entry being inconsistent with the second version number of the target virtual machine recorded in the source host machine, the processor is further configured to:
delete a flow entry comprising the first version number in the source host machine, and
send the data message to the target host machine through a virtual switch on the source host machine.

12. The network interface card according to claim 11, wherein the processor is further configured to:
before receiving the data message sent by the user, generate the first version number of the target virtual machine and add the first version number to the at least one flow entry; and
in response to determining that the target virtual machine is migrated from the source host machine to the target host machine, record the second version number of the target virtual machine after migration.

13. The network interface card according to claim 11, wherein the processor is further configured to:
in response to the target flow entry that is matched with the data message not being found,
generate a first flow entry according to the data message through the virtual switch, and
add the first version number to the first flow entry.

14. The network interface card according to claim 13, wherein the processor is configured to:
establish a long connection data channel with a client of the user according to a client identifier of the user comprised in the data message through the virtual switch, and
construct the first flow entry according to a result of establishment of the long connection data channel through the virtual switch, wherein the first flow entry comprises interface configuration information of the long connection data channel.

15. The network interface card according to claim 11, wherein the processor is further configured to:
in response to the first version number of the target virtual machine comprised in the target flow entry being inconsistent with the second version number of the target virtual machine recorded in the source host machine:
generate a second flow entry corresponding to the data message through the virtual switch,
add the second version number to the second flow entry through the virtual switch,
perform forwarding processing on the data message according to the second flow entry through the virtual switch, and
deliver the second flow entry to the target host machine through the virtual switch.

16. The network interface card according to claim 15, wherein the processor is configured to:
establish a long connection data channel between the target host machine and a client of the user according to a client identifier of the user comprised in the data message through the virtual switch, and
construct the second flow entry according to a result of establishment of the long connection data channel through the virtual switch, wherein the second flow entry comprises interface configuration information of the long connection data channel.

17. The network interface card according to claim 11, wherein the processor is further configured to:
in response to the first version number of the target virtual machine comprised in the target flow entry being consistent with the second version number of the target virtual machine recorded in the source host machine:
determine an attribute identifier of the data message,
determine, in the target flow entry, a set of actions corresponding to the attribute identifier, and
forward the data message according to the set of actions.

18. The network interface card according to claim 11, wherein the processor is configured to:
determine, according to a user identifier of the user, the target virtual machine associated with the user in the source host machine,
determine the at least one flow entry corresponding to the target virtual machine, and
determine the target flow entry that is matched with the data message according to tuple data comprised in a header field of each flow entry.

19. The network interface card according to claim 11, wherein in response to the first version number of the target virtual machine in the target flow entry being consistent with the second version number of the target virtual machine recorded in the source host machine, determining that the target flow entry is a hit;
in response to the target flow entry being a hit, the processor is further configured to:
count a number of hits of the target flow entry within a target time interval; and
in response to the number of hits being less than a preset number threshold, delete the flow entry comprising the first version number in the source host machine.

20. A computing device in a source host machine in which a target virtual machine is located before the target virtual machine is migrated to a target host machine, comprising:
- a memory and a processor,
    - wherein the memory is configured to store computer-executable instructions,
    - wherein the processor is configured to execute the computer-executable instructions, and
    - wherein, in response to the computer-executable instructions being executed by the processor, the processor is configured to:
        - receive a data message sent by a user, and
        - determine a target flow entry that is matched with the data message,
            - wherein the target flow entry is one of at least one flow entry corresponding to the target virtual machine in the source host machine,
            - wherein a first version number of the target virtual machine is in the target flow entry,
    - wherein, in response to the target virtual machine being migrated to the target host machine, a second version number of the target virtual machine is generated, and
    - wherein, in response to the first version number of the target virtual machine in the target flow entry being inconsistent with the second version number of the target virtual machine recorded in the source host machine, the processor is further configured to:
        - delete a flow entry comprising the first version number in the source host machine, and
        - send the data message to the target host machine through a virtual switch run on the source host machine.

* * * * *